March 23, 1943.  Y. G. JANDER  2,314,620
SAFETY MEANS FOR AGRICULTURAL IMPLEMENTS
Filed Feb. 8, 1941
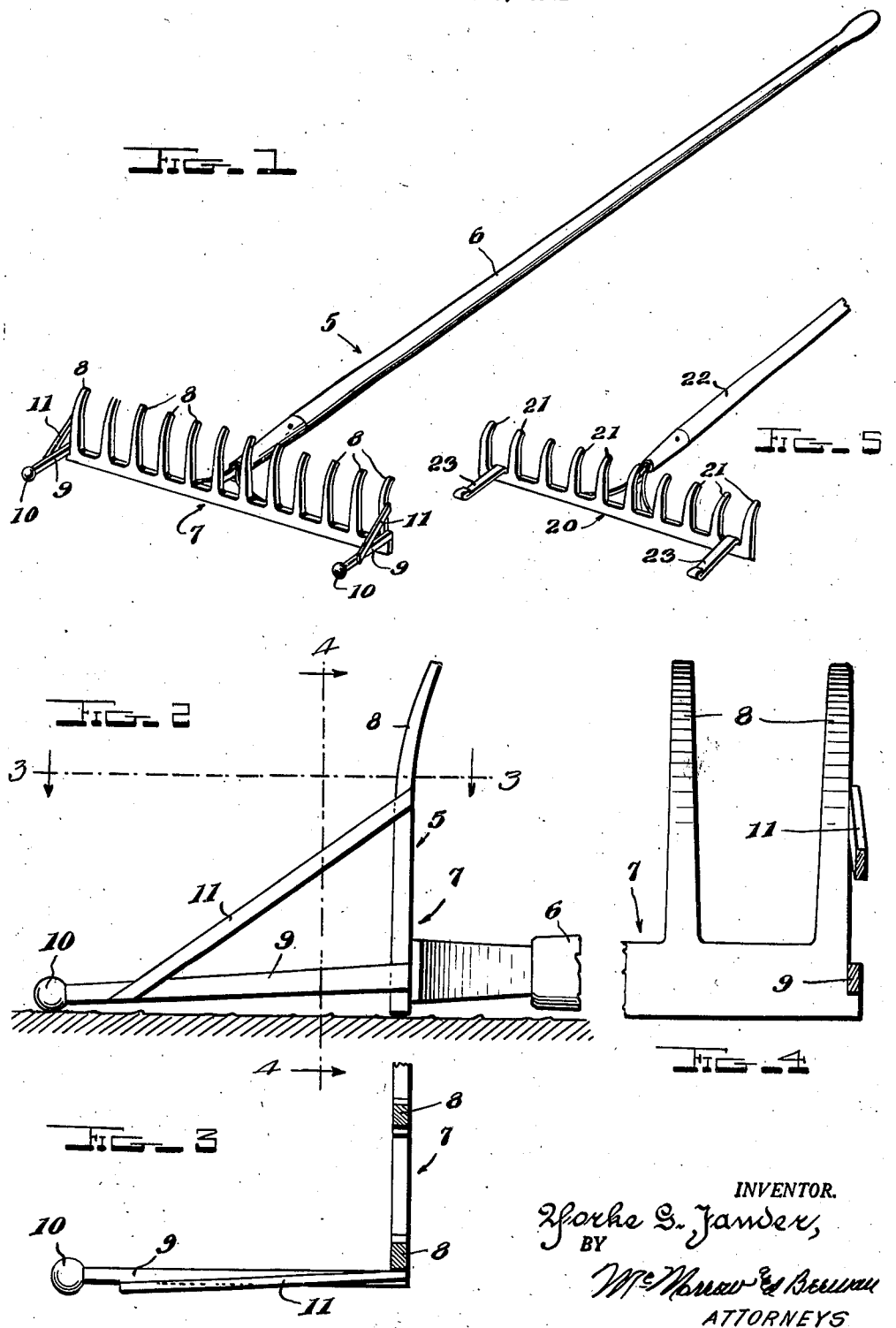
INVENTOR.
Yorke G. Jander,
BY
McMorrow & Berman
ATTORNEYS Patented Mar. 23, 1943

2,314,620

UNITED STATES PATENT OFFICE 2,314,620

SAFETY MEANS FOR AGRICULTURAL IMPLEMENTS

Yorke G. Jander, Greenwich, Conn.

Application February 8, 1941, Serial No. 378,090

1 Claim. (Cl. 56—400.14)

My invention is directed to safety means for agricultural implements or tools.

Due to carelessness, agricultural implements or tools, for instance, rakes, hoes or the like, are often left lying on the ground with their handles disposed in substantial horizontality and with their tines or blades disposed upwardly in substantial verticality. When a tool is thus disposed on the ground any one stepping on the tines or blade will cause the handle to be pivoted upwardly with a resultant striking of the person and which often results in serious injury.

One of the principal objects of my invention is to provide safety means for incorporation with a tool of the above described character and which is so constructed and arranged as to preclude pivoting of the handle of the tool should any one inadvertently step on the tines or blade when the tool is left lying in the aforementioned position.

An important object of my invention is to provide a device of the character described which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a perspective view of a rake having my invention applied thereto.

Figure 2 is a side elevation of the rake head having my invention incorporated therewith.

Figures 3 and 4 are sectional views taken on the lines 3—3 and 4—4 respectively of Figure 2.

Figure 5 is a detail perspective view of a modified form.

In teaching my invention, as illustrated in Figures 1 to 4 inclusive of the drawing, I employ an agricultural tool or implement 5 provided with a handle 6 and a tool head 7 connected to the handle in the usual manner of such implements. The tool head 7 is provided with a pectiniform blade having its spaced tines 8 extending in a plane substantially right angularly related to the axis of the handle 6.

Secured to the side faces of the blade, adjacent the base ends of the outermost tines, are a pair of forwardly extending bars or members 9, the latter being disposed in substantial parallelism with the handle. The front end of each member 9 is provided with a bulbous ground engaging section 10 and has fixed thereto, postjacent the respective section 10, one end of a brace 11. The opposite ends of the braces 11 are connected to the outermost tines interjacent their base and free ends. While the braces 11 and members 9 are secured to the tool head or blade by means of welding or the like, it is to be understood that the same may be bolted or otherwise secured to the tool head either permanently or detachably.

In the modified form disclosed in Figure 5, the tool head is provided with a pectiniform blade having spaced tines 21 and said tool head is secured to the handle 22 in the same manner as in the preferred embodiment of the invention illustrated in Figures 1 to 4 inclusive of the drawing. Between the outermost pairs of the tines 21, the blade is structurally integrally formed with forwardly projecting bars or members 23, the latter forming, together with the tines, integrants of the one-piece tool head 20.

From the foregoing it will be apparent that when the tool is disposed on the ground with the handle in substantially horizontality and the tines in substantially verticality the outer ends of the forwardly extending members will engage the ground when pressure is exerted upon the upper ends of the tines, by a person stepping thereon or the like, and thus preclude upward pivoting of the handle and resultant striking of the person by said handle.

While I have illustrated and described my invention in connection with a rake, it is to be distinctly understood that other similar tools, for instance, hoes, cutters and the like may also be equipped therewith as a safety precaution. It is also to be understood that the braces 11 may be eliminated when the members or bars are of a sufficient strength to properly perform their function and that said members or bars, at their rear coincident ends, may be detachably connected to the blade thereby permitting said members to be marketed as an accessory for tools of the foregoing described type.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What I claim is:

In a hand operated agricultural implement, an elongated narrow head including spaced parallel tines for hand raking of materials, a handle secured to the head intermediate the ends of the latter and extending at right angles thereto and in one direction, parallel elongated rigid members formed on the ends of the head and extending at right angles thereto and in an opposite direction from the handle and parallel with the longitudinal axis of the handle and having the free ends thereof enlarged and rounded to coact therewith in engaging the ground when the head with the tines directed upwardly and the handle are lying on the ground to prevent the head from pivoting on the ground under the weight of a person on the tines and the handle striking the person, and braces connecting the members to the end tines and spaced from the ends of said latter-named tines and the enlarged rounded ends of the members.

YORKE G. JANDER.